US011509688B1

(12) United States Patent
Shintre

(10) Patent No.: US 11,509,688 B1
(45) Date of Patent: Nov. 22, 2022

(54) VIRTUAL AD BLOCKING ON A COMPUTING DEVICE

(71) Applicant: SYMANTEC CORPORATION, Mountain View, CA (US)

(72) Inventor: Saurabh Shintre, Sunnyvale, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 759 days.

(21) Appl. No.: 16/452,019

(22) Filed: Jun. 25, 2019

(51) Int. Cl.
*H04L 9/40* (2022.01)
*G06F 9/455* (2018.01)
*G06N 20/00* (2019.01)
*G06F 9/50* (2006.01)

(52) U.S. Cl.
CPC ...... H04L 63/1483 (2013.01); G06F 9/45533 (2013.01); G06F 9/505 (2013.01); G06N 20/00 (2019.01)

(58) Field of Classification Search
CPC . H04L 63/1483; G06N 20/00; G06F 9/45533; G06F 9/505
See application file for complete search history.

(56) References Cited

U.S. PATENT DOCUMENTS

| | | | |
|---|---|---|---|
| 9,241,004 B1 * | 1/2016 | April | G06F 21/645 |
| 10,320,809 B1 * | 6/2019 | Alexander | G06F 21/53 |
| 2009/0292984 A1 * | 11/2009 | Bauchot | H04L 51/212 |
| | | | 345/581 |
| 2014/0129920 A1 * | 5/2014 | Sheretov | H04L 63/20 |
| | | | 715/234 |
| 2015/0033331 A1 * | 1/2015 | Stern | H04L 63/1425 |
| | | | 726/22 |
| 2015/0254555 A1 * | 9/2015 | Williams, Jr. | G06N 3/084 |
| | | | 706/14 |
| 2016/0154539 A1 * | 6/2016 | Buddhiraja | G06F 3/0481 |
| | | | 715/738 |
| 2018/0307508 A1 * | 10/2018 | Banerjee | G06F 9/452 |

OTHER PUBLICATIONS

Iqbal et al. (ADGRAPH: A Graph-Based Approach to Ad and Tracker Blocking, arXiv, May 30, 2019, 14 pages) (Year: 2019).*

(Continued)

*Primary Examiner* — Oleg Korsak
(74) *Attorney, Agent, or Firm* — Maschoff Brennan

(57) ABSTRACT

Virtual ad blocking on a computing device. In some embodiments, a method may include receiving, at the virtual machine, an indication that the computing device is requesting delivery of a web page, downloading, at the virtual machine, the web page, rendering, at the virtual machine, a first version of the web page, identifying, at the virtual machine, a presence of at least one advertisement element on the rendered first version of the web page, removing, at the virtual machine, the presence of the at least one advertisement element on the rendered first version of the web page, rendering, at the virtual machine, a second version of the web page that does not include the presence of the at least one advertisement element, and sending the second version of the web page that does not include the presence of the at least one advertisement element to the computing device.

20 Claims, 4 Drawing Sheets

(56) References Cited

OTHER PUBLICATIONS

Estrada-Jimenez et al (Online Advertising: Analysis of Privacy Threats and Protection Approaches, comcom, Dec. 16, 2016, 22 pages) (Year: 2016).*
BRAVE; "Brave Proposes a Machine Learning Approach for Ad Blocking"; Webpage; located at: https://brave.com/brave-proposes-a-machine-learning-approach-for-ad-blocking/; May 25, 2018; 1 page.
Tramer et al.; "Perceptual Ad-Blocking: Meet Adversarial Machine Learning"; pdf presentation; located at: https://floriantramer.com/docs/slides/pan19adblock.pdf; Feb. 22, 2019; 28 pages.
Tramer et al.; "Perceptual Ad-Blocking: Meets Adversarial Machine Learning"; white paper; located at: https://arxiv.org/pdf/1811.03194.pdf; Feb. 26, 2019; 28 pages.
Citrix Systems, Inc.; "Protect your network from browser-based attacks"; Webpage; located at: https://www.citrix.com/digital-workspace/secure-browser.html; 1999-2019; 1 page.

* cited by examiner

VIRTUAL AD BLOCKING ON A COMPUTING DEVICE

BACKGROUND

Many companies earn revenue through the use of online advertisements. These advertisements may be personalized to the user (e.g., based on user tracking, cookies, etc.), and may be placed on web pages and other online applications where a user can click on or otherwise interact with the advertisement. Advertisements can be bothersome to users, and in some cases, users may find advertisements to intrude on their privacy. Thus, users may install a web browser plug-in (or other application) to block advertisements from view (i.e., an ad blocker).

In some cases, however, websites may prevent a user from fully experiencing the website unless the user agrees to remove the ad blocker. In additional or alternative embodiments, some companies are able to block ad blockers, thus rendering the ad blocker inoperable. Thus, users are in need of a way to prevent advertisements from intruding on the user's browsing experience.

The subject matter claimed herein is not limited to embodiments that solve any disadvantages or that operate only in environments such as those described above; rather, this background is only provided to illustrate one example technology area where some embodiments described herein may be practiced.

SUMMARY

In some embodiments, a computer-implemented method for virtual ad blocking on a computing device may at least partially be performed by a virtual machine. The method may include receiving, at the virtual machine, an indication that the computing device is requesting delivery of a web page, downloading, at the virtual machine, the web page, rendering, at the virtual machine, a first version of the webpage, identifying, at the virtual machine, a presence of at least one advertisement element on the rendered first version of the web page, removing, at the virtual machine, the presence of the at least one advertisement element on the rendered first version of the webpage, rendering, at the virtual machine, a second version of the web page that does not include the presence of the at least one advertisement element, and sending, from the virtual machine, the second version of the web page that does not include the presence of the at least one advertisement element to the computing device.

In some embodiments, the identifying of the presence of the at least one advertisement element on the web page may further include applying at the virtual machine, a machine learning algorithm to the rendered first version of the web page.

In some embodiments, the applying of the machine learning algorithm may further include determining that the at least one advertisement element satisfies a pre-determined advertisement element pattern.

In some embodiments, the method may further include receiving feedback from the computing device regarding identification of the presence of the at least one advertisement element on the rendered first version of the web page; and adjusting the machine learning algorithm based on receiving the feedback.

In some embodiments, the virtual machine may be an emulation of the computing device executing on the computing device or on a remote server.

In some embodiments, the rendering of the first version of the web page that does not include the presence of the at least one advertisement element may further include executing the web page on a web isolation platform.

In some embodiments, the method may further include identifying a presence of malicious code on the web page, and the rendering of the rendered first version of the web page that does not include the presence of the at least one advertisement element may further include taking a security action based on identifying the presence of malicious code.

In some embodiments, the security action may include one or more of adding a web server associated with the web page to a blacklist, blocking network connectivity to the web server associated with the web page, or sending an alert to the computing device.

In some embodiments, a computer device may include a processor, a memory in electronic communication with the processor, and instructions stored in the memory, with the instructions being executable by the processor on a virtual machine to perform a method for virtual ad blocking on the computing device.

In some embodiments, one or more non-transitory computer-readable media may include one or more computer-readable instructions that, when executed by one or more processors of a computing device, cause the computing device to perform a method for virtual ad blocking on the computing device, with at least a portion of the method being performed by a virtual machine.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Frequently, users find online advertisements ("ads") to be bothersome, intrusive, and distracting. In additional or alternative cases, users may feel that ads are supported by major corporations that gather personal information about users, and then target the users using intrusive methods. In order to improve the browsing experience, a user may install an ad blocker.

Figure 1:
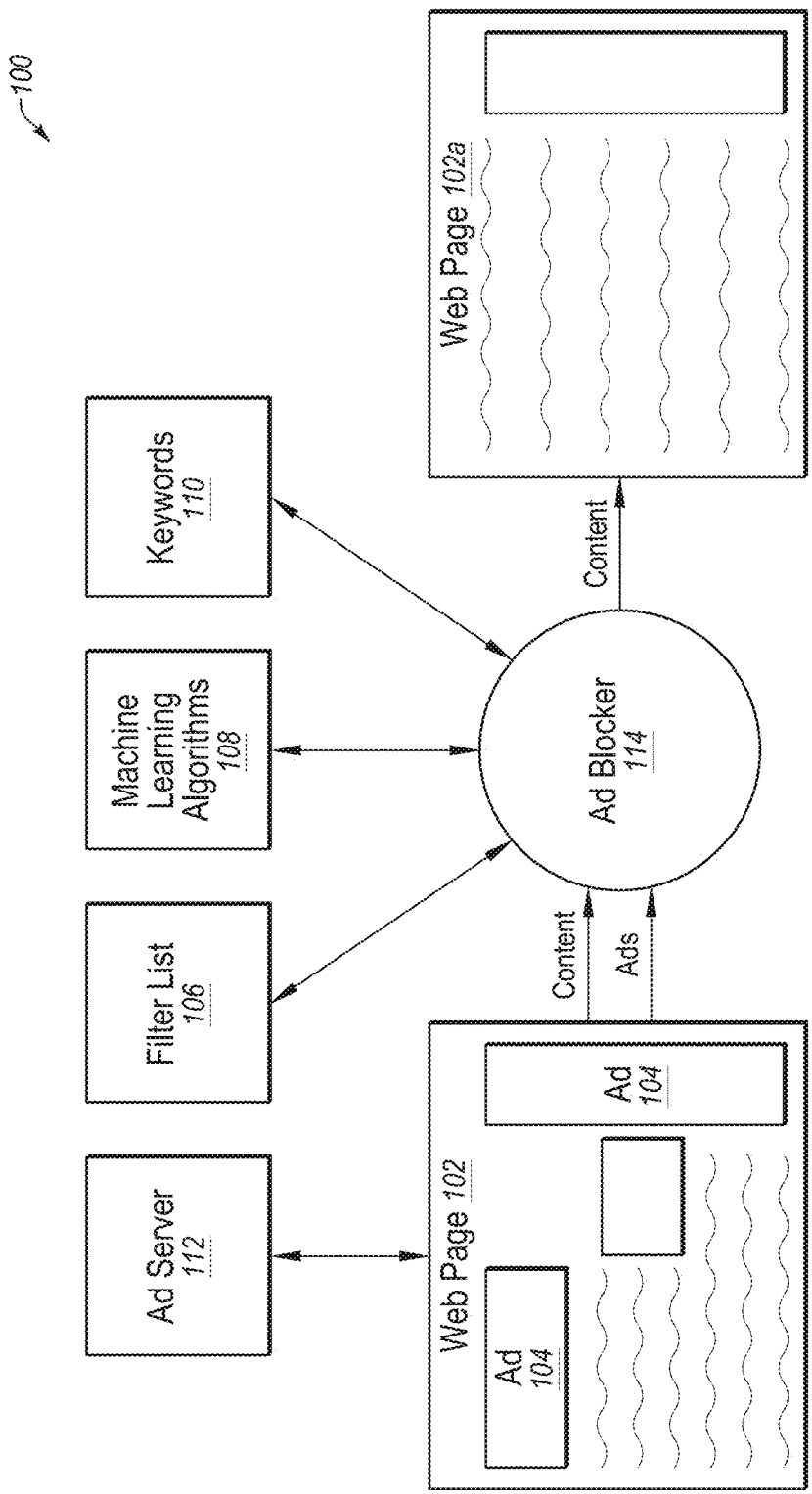
FIG. 1 illustrates an example architecture for ad blocking on a computing device.

Turning to the figures, FIG. 1 illustrates an example architecture for ad blocking on a computing device. In one embodiment, a web page 102 may be one of a many web pages that make up part of a website hosted on a web server. The web page 102 may contain ads which are received from an ad server 112. The web page 102 may have ads 104 which are placed over or within parts of the web page 102. In some embodiments, the ads 104 may be generic to all users to the web page 102. In alternative embodiments, the ads 104 may be specific to a user and determined based on user tracking, cookies, etc. In a situation where the user has not installed an ad blocker, the web page 102 may be requested by the user, and the user may receive the web page 102 complete with ads 104.

In some embodiments, however, the user may have installed an ad blocker 114. In some embodiments, the ad blocker 114 may be a web browser plug-in that blocks ads. The ad blocker 114 may work in multiple ways. In some embodiments, the ad blocker 114 may use communication blocking, where the ad blocker 114 blocks downloads from known ad servers, such as the ad server 112, by using example filter lists 106. Filter lists may be sets of rules that inform the ad blocker what type of content to block. Filter lists may be custom to each ad blocker and/or customizable by users.

In additional or alternative embodiments, the ad blocker 114 may use element blocking, where the ad blocker blocks any JavaScript and/or HyperText Markup Language (HTML) elements that contain keywords 110 associated with ads. For example, several ad blockers may use JavaScript signatures for detecting ads. In some embodiments, newer ad blockers may use machine learning (e.g., neural networking, nearest neighbor, decision trees, etc.) ad blocking, such as perceptual ad blocking.

In one embodiment, perceptual ad-blocking may be an ad-detection approach relying on visual clues to detect ads. A perceptual ad-blocker may be a visual classifier. For example, many online ads are marked with indicators that the ads are in fact ads, such as a "sponsored" link, the "x" symbol for closing a pop-up window, known ad logos, and the like. Other ad cues may include repeated or similar looking images, logos, text placement, text, the location of an ad on a web page, the size of an image or embedded object on the web page, metadata associated with the web page, etc.

In some example embodiments, a machine learning perceptual ad blocker may be a visual classifier trained on a large quantity of images, such as screenshots, obtained from a variety of web pages that have labeled advertisements. In some embodiments, the labels may come from user feedback. A machine learning algorithm may create a model of what an ad looks like based on the images and the user feedback.

Adversaries (e.g., ad creators) may attempt to evade ad blockers by modifying web content or the ads in a way that confuses or obfuscates the ad blocker. Also, adversaries may detect if a user is blocking ads and prevent the user from accessing content. In some cases, adversaries may actually be malware intended to trick a user into a security attack. In some embodiments, adversarial ads (e.g., elements) may be encoded into HTML elements controlled by the adversary. The encoding enables the adversary to effect content changes from parties and to scale the elements to a large quantity of pages and ads.

Thus, using a perceptual machine learning ad blocker, continuous trained machine learning models may be used to detect ads using visual cues on a rendered page, where the rendered page does not run afoul of HTML or other coded elements. In embodiments where the user has installed the ad blocker 114, the user may request the web page 102, the ad blocker 114 may "block" the ads 104, and the user may receive a web page 102a, where the web page 102a does not contain the ads 104. In some embodiments, when the ads 104 are "blocked," the ad blocker 114 replaces the ads 104 with alternative images, videos, text, etc. In additional or alternative embodiments, when the ads 104 are "blocked," the space in which the ads 104 originally resides remain empty.

Advertisers and companies that pay advertisers for advertising services, however, are beginning to develop applications that block ad blockers and/or prevent users from experiencing the content on a web page if the user chooses to use an ad blocker. Thus, systems and methods are described that provide users with an ad-free experience regardless of whether the advertisers are blocking ad blockers.

Figure 2:
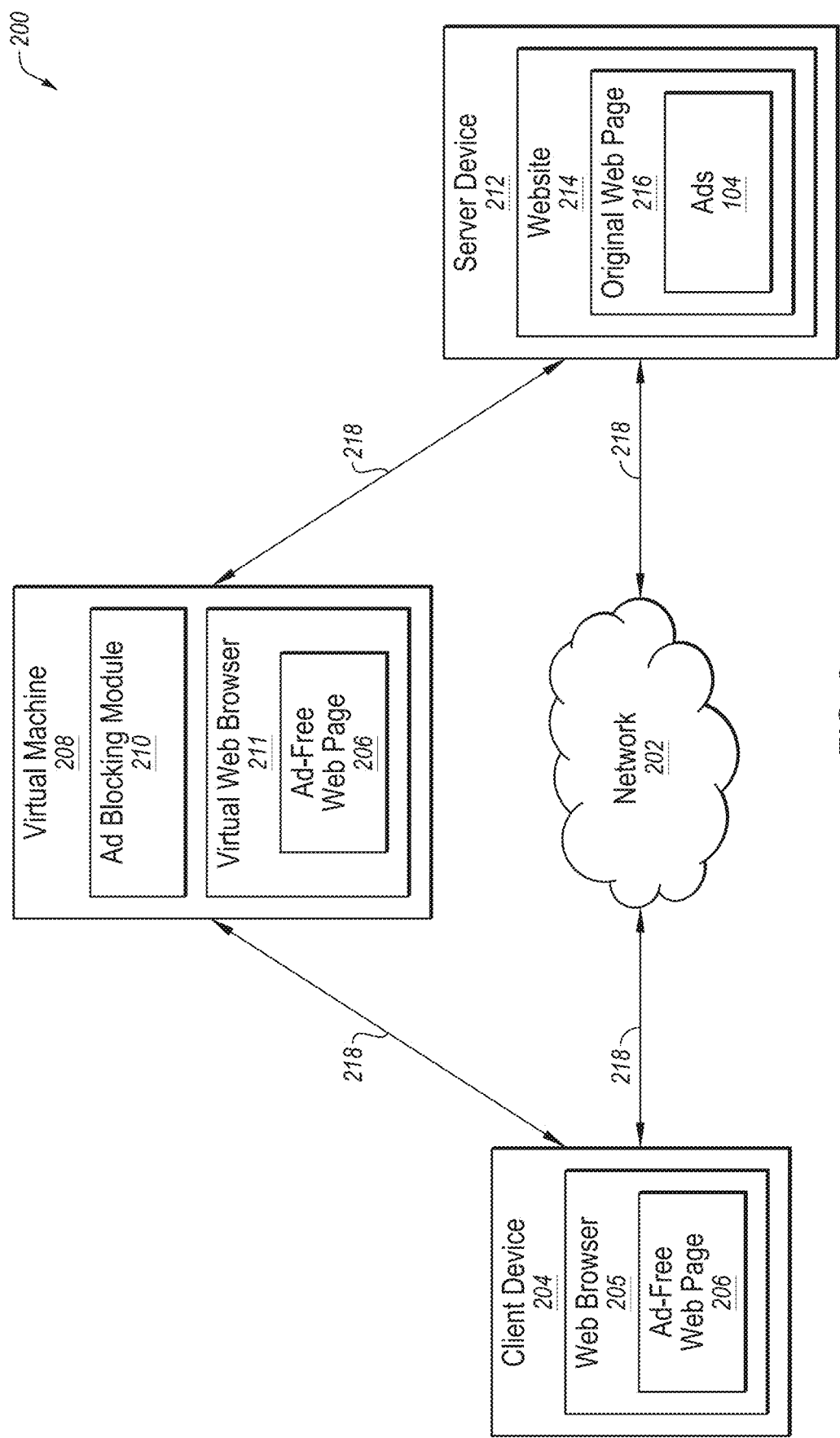
FIG. 2 illustrates an example system for virtual ad blocking on a computing device.

FIG. 2 illustrates an example system 200 configured for virtual ad blocking on a computing device. The example system 200 may use a virtual web browser 211 on a back end that receives an original web page 216 complete with ads 104, as well as a rendering mechanism which renders an image version of the original web page 216, and then removes ads 104 detected on the original web page 216. After the pre-processing for rendering the original web page 216 is complete, and the ads 104 are detected and removed, an ad-free web page 206 is rendered for the user and sent to the client device 204.

More specifically, the system 200 may include a network 202, the client device 204, a server device 212, and a virtual machine 208. In some embodiments, an ad blocking module 210 may execute on the virtual machine 208. In other embodiments, however, the ad blocking module 210 may execute on the client device 204, on the server device 212, or on another stand-alone device not specifically shown in FIG. 2.

In some embodiments, the network 202 may be configured to communicatively couple the client device 204, the server device 212, and the virtual machine 208 by way of the communication links 218. Although not specifically shown in FIG. 2, the client device 204 may directly communicate with the server device 212 by way of the communication links 218. In some embodiments, the network 202 may be any wired or wireless network, or combination of multiple networks, configured to send and receive communications between systems and devices. In some embodiments, the network 202 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 202 may also be coupled to, or may include, portions of a telecommunications network, including telephone lines, for sending data in a variety of different communication protocols, such as a cellular network or a Voice over IP (VoIP) network.

Figure 4:
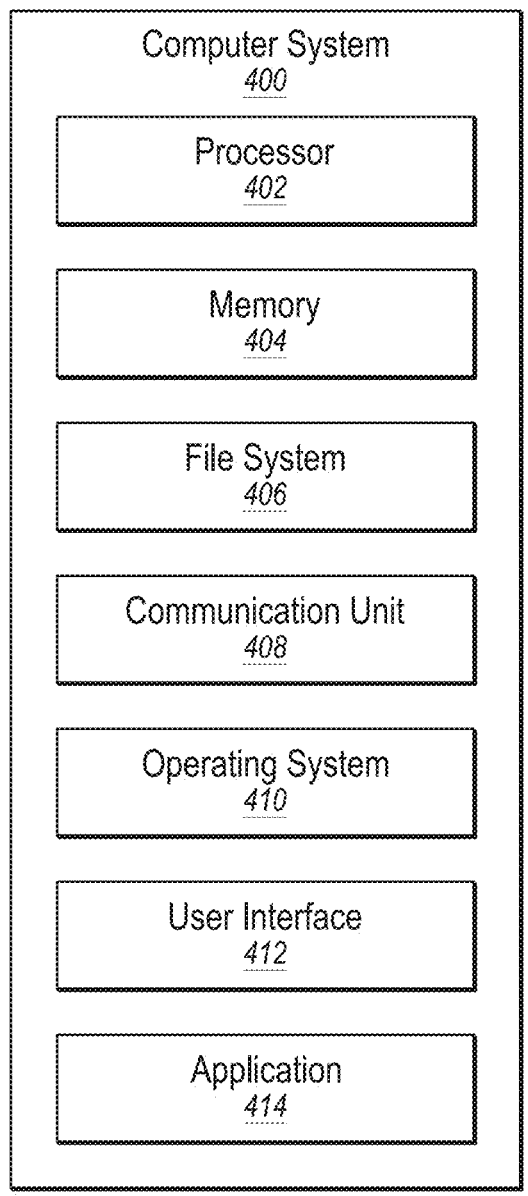
FIG. 4 illustrates an example computer system that may be employed in virtual ad blocking on a computing device.

In some embodiments, the client device 204 may be any computer system capable of communicating over the network 202 and capable of requesting and receiving web pages at a web browser 205, examples of which are disclosed herein in connection with the computer system 400 of FIG. 4. Similarly, in some embodiments, the server device 212 may be any computer system capable of communicating over the network 202 and capable of hosting web sites and web pages, such as a website 214 and an original web page 216, as well as obtaining ads 104 from a computing system, including a remote computing system, examples of which are disclosed herein in connection with the computer system 400 of FIG. 4.

The virtual machine 208 may be executing on a dedicated virtual platform in which web pages may be opened in an isolated, virtual environment. Content may be received by the virtual machine 208, pre-process for a first rendering, the rendering manipulated, and then the manipulated content rendered again in an alternate form. The rendered content may then be streamed back to the client device 204 using an application delivery method and/or remote desktop technology. In some embodiments, the virtual machine 208 may be on a back end computing device, accessed remotely through the cloud, or on a private network. In some embodiments, the virtual machine 208 may be an emulation of the client device 204 that is executing on the client device 204 or on the server device 212. In one embodiment, the ad blocking module 210 may operate as an ad blocker using machine learning-based ad blocking and may also operate as a rendering mechanism to render an ad-free web page 206 for a user.

In some embodiments, a user may interact with the web browser 205 to access a web page on the client device 204. The virtual machine 208 may execute a virtual instance of the web browser (e.g., the virtual web browser 211) on the back end, where the virtual web browser 211 does not have an ad blocking plug-in or other ad blocking application. In addition, the client device 204 is not associated with an ad blocker, and thus, the server device 212 does not detect the use of an ad blocker and sends the requested original web page 216, containing the ads 104, to the client device 204. Because the server device 212 does not detect an ad blocker, the server device 212 may not take any actions to prevent the user (or the virtual machine 208) from accessing the content on the original web page 216.

The ad blocking module 210 may process the received original web page in order to produce a first rendered version of the original web page 216. In one embodiment, the first rendered version of the original web page 216 may rendered by way of making a visual "copy" of the original web page 216. Due to the nature of adversarially created ads 104 present on the original web page 216, the first rendering of the original web page 216 may alter the behavior of the adversarially created ads 104, thus making it harder to another application to detect whether the ads 104 have been blocked or not.

In one embodiment, prior to detecting an ads 104 on the now-rendered web page, the ad blocking module 210 may further process the now-rendered web page by way of compression, resizing, color changes, etc., as may be helpful in reducing bandwidth or other communication and display considerations.

The ad blocking module 210 may then implement a machine-learning based ad blocker which detects the ads 104 associated with the original web page 216. In one embodiment, the ad blocking module 210 may be a vision-based machine learning classifier that identifies ad elements on the original web page 216. In an additional or alternative embodiment, the ad blocking module 210 may use perceptual ad blocking to automatically identify similar patterns, images, logos, text placement, text, ad words, ad placement, etc.

The ad blocking module 210 may then filter out the ads 104 on the visual display of the first rendering of the original web page 210, as opposed to filtering the ads through the code of the original web page 216. The ad blocking module 210 then renders an ad-free copy of the original web page 216 (e.g., the ad-free web page 206) (e.g., a second rendered version) and may deliver the now ad-free web page 206 to the client device 204. In one embodiment, the ad blocking module 210 may use a rendering machine or web isolation application or platform such as FIREGLASS™, or SYMANTEC WEB ISOLATION™, owned by SYMANTEC CORPORATION™. A web isolation application may create a secure execution environment between the end points (i.e., between the client device 204 and the server device 212). In one embodiment, each browsing session may be executed on the virtual machine 208, where the virtual machine 208 may use ad blocking module 210 to render the web content in real-time and send to the client device 204 only a visual and audio representation of the web content without the detected ads 104. In an additional or alternative embodiment, the execution of the original web page 216 may also operate to identify and block malicious activity, returning not only the ad-free web page 206 to the client device 204, but also a secure web page free from malicious content.

In one embodiment, the machine learning employed by the ad blocking module 210 may be continuously improved and refined through the receipt of user feedback. For example, the ad blocking module 201 may request user feedback to identify adversarial images, to improve classification through adversarial training, and to reduce adversarial perturbations.

Modifications, additions, or omissions may be made to the system 200 without departing from the scope of the present disclosure. For example, in some embodiments, the system 200 may include additional components similar to the components illustrated in FIG. 2 that each may be configured similarly to the components illustrated in FIG. 2.

Figure 3:
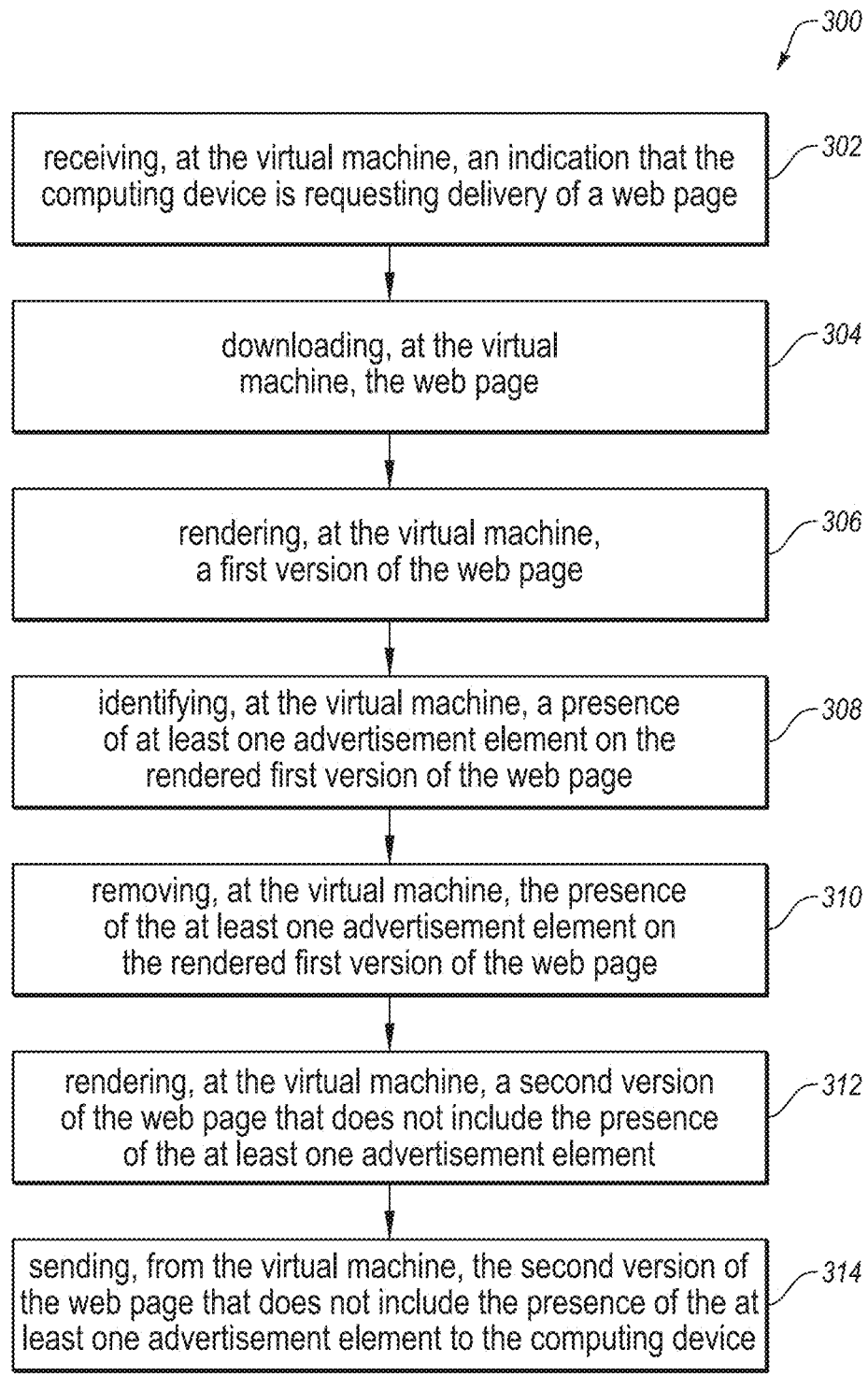
FIG. 3 illustrates a flowchart of an example method for virtual ad blocking on a computing device.

FIG. 3 is flowchart of an example method 300 for virtual ad blocking on a computing device. The method 300 may be performed, in some embodiments, by a device, module, and/or system, such as by the client device 204, the server device 212, the virtual machine 208, and/or the ad blocking module 210 executing on one of these devices or on another device. In these and other embodiments, the method 300 may be performed by one or more processors based on one or more computer-readable instructions stored on one or more non-transitory computer-readable media. The method 300 will now be described in connection with FIGS. 1, 2, and 3.

At action 302, the method may include receiving an indication that a computing device is requesting delivery of a web page. For example, the web browser 205 of the client device 204 may request the original web page 216 from the server device 212. The virtual machine 208 may be executing the virtual web browser 211 (on the client device 204 or some other device), and the virtual machine 208 may intercept the delivery of the original web page 216.

At action 304, the method may include downloading the web page. For example, the virtual machine 208 may download the original web page 216 intended for the web browser 205 of the client device 204, including the ads 104 that may be associated with the original web page 216.

At action 306, the method may include rendering, at the virtual machine, a first version of the web page. For example, the virtual machine 208 may create an image that is a visual representation of the original web page 216. The rendering may include processing such as compression, color adjustments, size adjustments, and the like.

At action 308, the method may include identifying a presence of at least one advertisement element on the rendered version of the web page. In some embodiments, the action 306 may include applying, at the virtual machine 208, a machine learning algorithm to the visual representation of the original web page 216, which may include identifying that the at least one advertisement element satisfies a predetermined advertisement element pattern. For example, the ad blocking module 210 may use machine learning ad blocking (e.g., perceptual ad blocking) to identify the ads 104 present on the original web page 216. In another example, other ad blocking methods may be used to identify the ads 104 on the original web page 216.

At action 308, the method may include, removing, at the virtual machine, the presence of the at least one advertisement element on the rendered first version of the webpage. For example, the ad blocking module 210 may create a second version of the rendered first version of the original web page 216 by placing an empty section where an ad 104 was identified to be. In another embodiment, the removal of the advertisement elements may include replacing the advertisement elements with a non-adversarial element such as a placeholder image.

At action 310, the method may include rendering the second version of the web page that does not include the presence of the at least one advertisement element. For example, the ad blocking module 210 may use a web isolation program, such as FIREGLASS™, or SYMANTEC WEB ISOLATION™, and/or a virtual web browser 211, to render a version of the original web page 216 that includes the text, images, video, and audio elements of the original web page 216, but does not include the text, images, video, or audio elements associated with the identified ads 104.

At action 312, the method may include sending the second version of the web page that does not include the presence of the at least one advertisement element to the computing device. For example, after compressing the original web page 216 and using machine learning ad blocking methods to "block" the ads 104 on the original web page 216, the virtual machine 208 may send the rendered ad-free web page 206 to the web browser 205 client device 204.

In an additional or alternative embodiment, the method may further include identifying a presence of malicious code on the original web page. For example, before the virtual machine 208 sends the rendered ad-free web page 206, the ad-free web page 206 may further be processed to identify the presence of malicious code, and then to remove the malicious code. In an additional or alternative embodiment, a security action may be taken by the virtual machine 208, at the server device 212, and/or at the client device 204, based on the identifying of the presence of the malicious code, such adding a web server associated with the web page to a blacklist, blocking network connectivity to the web server associated with the web page, or sending an alert to the server device 212 and/or to the client device 204.

Although the actions of the method 300 are illustrated in FIG. 3 as discrete actions, various actions may be divided into additional actions, combined into fewer actions, reordered, expanded, or eliminated, depending on the desired implementation.

The method 300 may provide a plurality of benefits and technological improvements, and may result in the practical application virtual ad blocking on the client device 204. Furthermore, the method 300 described herein may provide the technological improvement of preventing ads from being displayed to a user when a user requests a web page. In some cases, the ads may slow down performance of the client device 204, may result in dropped packets and slow down network connectivity, may clutter a web page, may alter the intended look and feel intended by a web page developer, may result in unauthorized user tracking, etc. Thus, preventing the delivery of ads, and preventing an advertiser from realizing the ads have been blocked and not delivered, may result in improving the technological field of web browsing, as well as provide a practical application, by way of at least the faster loading of web pages, lower bandwidth usage, faster network connectivity, increased privacy, increased security, and an overall improved experience for the user.

FIG. 4 illustrates an example computer system that may be employed in virtual ad blocking. In some embodiments, the computer system 400 may be part of any of the systems or devices described in this disclosure. For example, the computer system 400 may be part of any of the client device 204, the server device 212, the virtual machine 208, and/or the ad blocking module 210 of FIG. 2.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more modules, such as the ad blocking module 210 of FIG. 2, or in some combination thereof.

The communication unit 408 may include any component, device, system, or combination thereof configured to transmit or receive information over a network, such as the network 202 of FIG. 2. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the ad blocking module 210 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, is described with reference to specific embodiments; however, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed, and various embodiments with various modifications as may be suited to the particular use contemplated.

The invention claimed is:

1. A computer-implemented method for virtual ad blocking on a computing device, at least a portion of the method being performed by a virtual machine, the method comprising:
   receiving, at the virtual machine, an indication that the computing device is requesting delivery of a web page;
   downloading, at the virtual machine, the web page;
   rendering, at the virtual machine, a first version of the web page, wherein the first version of the web page is rendered by creating a visual representation of the web page;
   identifying, at the virtual machine, a presence of at least one advertisement element on the rendered first version of the web page, wherein the at least one advertisement element on the rendered first version of the web page is identified based on a visual analysis of the first version of the web page;
   removing, at the virtual machine, the presence of the at least one advertisement element on the rendered first version of the web page;
   rendering, at the virtual machine, a second version of the web page that does not include the presence of the at least one advertisement element; and
   sending, from the virtual machine, the second version of the web page that does not include the presence of the at least one advertisement element to the computing device.

2. The method of claim 1, wherein the identifying of the presence of the at least one advertisement element on the web page further comprises:
   applying, at the virtual machine, a vision-based machine learning algorithm to the rendered first version of the web page.

3. The method of claim 2, wherein the applying of the machine learning algorithm further comprises:
   determining that the at least one advertisement element satisfies a pre-determined advertisement element pattern.

4. The method of claim 2, further comprising:
   receiving feedback from the computing device regarding identification of the presence of the at least one advertisement element on the rendered first version of the web page; and
   adjusting the machine learning algorithm based on receiving the feedback.

5. The method of claim 1, wherein the virtual machine is an emulation of the computing device executing on the computing device.

6. The method of claim 1, wherein the virtual machine is an emulation of the computing device executing on a remote server.

7. The method of claim 1, wherein the rendering of the first version of the web page that does not include the presence of the at least one advertisement element further comprises:
   executing the web page on a web isolation platform.

8. The method of claim 1, further comprising:
   identifying a presence of malicious code on the web page, wherein the rendering of the second version of the web page that does not include the presence of the at least one advertisement element further comprises taking a security action based on the identified presence of malicious code.

9. The method of claim 8, wherein the security action comprises one or more of:
   adding a web server associated with the web page to a blacklist, blocking network connectivity to the web server associated with the web page, or sending an alert to the computing device.

10. A computing device for virtual ad blocking; comprising:
    a processor;
    a memory in electronic communication with the processor; and
    instructions stored in the memory, the instructions being executable by the processor on a virtual machine to:
      receive, at the virtual machine, an indication that the computing device is requesting delivery of a web page;
      download, at the virtual machine, the web page;
      render, at the virtual machine, a first version of the web page;
      identify, at the virtual machine, a presence of at least one advertisement element on the rendered first version of the web page;
      remove, at the virtual machine, the presence of the at least one advertisement element on the rendered first version of the web page;
      render, at the virtual machine, a second version of the web page that does not include the presence of the at least one advertisement element;
      identify, at the virtual machine, a presence of malicious code on the second version of the web page, wherein the instructions are further executable to take a security action based on the identified presence of malicious code; and
      send, from the virtual machine, the second version of the web page that does not include the presence of the at least one advertisement element to the computing device.

11. The computing device of claim 10, wherein when the processor identifies the presence of the at least one advertisement element on the web page, the instructions are further executable to:
    apply, at the virtual machine, a machine learning algorithm to the rendered first version of the web page.

12. The computing device of claim 11, wherein when the processor applies the machine learning algorithm, the instructions are further executable to:
    determine that the at least one advertisement element satisfies a pre-determined advertisement element pattern.

13. The computing device of claim 11, the instructions further executable to:
- receive feedback from the computing device regarding identification of the presence of the at least one advertisement element on the rendered first version of the web page; and
- adjust the machine learning algorithm based on receiving the feedback.

14. The computing device of claim 10, further comprising where the virtual machine is an emulation of the computing device executing on the computing device.

15. The computing device of claim 10, wherein when the processor renders the first version of the web page that does not include the presence of the at least one advertisement element, the instructions are further executable to:
- execute the web page on a web isolation platform.

16. The computing device of claim 10, wherein when the processor takes the security action, the instructions are further executable to:
- add a web server associated with the web page to a blacklist, block network connectivity to the web server associated with the web page, or send an alert to the computing device.

17. One or more non-transitory computer-readable media comprising one or more computer readable instructions that, when executed by one or more processors of a computing device, cause the computing device to perform a method for virtual ad blocking on the computing device, at least a portion of the method being performed by a virtual machine, the method comprising:
- receiving, at the virtual machine, an indication that the computing device is requesting delivery of a web page;
- downloading, at the virtual machine, the web page;
- rendering, at the virtual machine, a first version of the web page, wherein the first version of the web page is rendered by creating a visual representation of the web page;
- identifying, at the virtual machine, a presence of at least one advertisement element on the rendered first version of the web page, wherein the at least one advertisement element on the rendered first version of the web page is identified based on a visual analysis of the first version of the web page;
- removing, at the virtual machine, the presence of the at least one advertisement element on the rendered first version of the web page;
- rendering, at the virtual machine, a second version of the web page that does not include the presence of the at least one advertisement element; and
- sending, from the virtual machine, the second version of the web page that does not include the presence of the at least one advertisement element to the computing device.

18. The one or more non-transitory computer-readable media of claim 17, wherein the identifying of the presence of the at least one advertisement element on the web page further comprises:
- applying, at the virtual machine, a vision-based machine learning algorithm to the rendered first version of the web page.

19. The one or more non-transitory computer-readable media of claim 18, further comprising:
- receiving feedback from the computing device regarding identification of the presence of the at least one advertisement element on the rendered first version of the web page; and
- adjusting the machine learning algorithm based on receiving the feedback.

20. The one or more non-transitory computer-readable media of claim 17, further comprising:
- identifying a presence of malicious code on the web page, wherein the rendering of the second version of the web page that does not include the presence of the at least one advertisement element further comprises taking a security action based on the identified presence of malicious code.

* * * * *